July 14, 1970   J. G. KRIZIK   3,520,183
APPARATUS FOR MEASURING CHANGES IN DISPLACEMENT IN A BODY
Filed Oct. 12, 1967   2 Sheets-Sheet 1

Inventor:
Jan G. Krizik,
by
Attorney

July 14, 1970    J. G. KRIZIK    3,520,183
APPARATUS FOR MEASURING CHANGES IN DISPLACEMENT IN A BODY
Filed Oct. 12, 1967    2 Sheets-Sheet 2
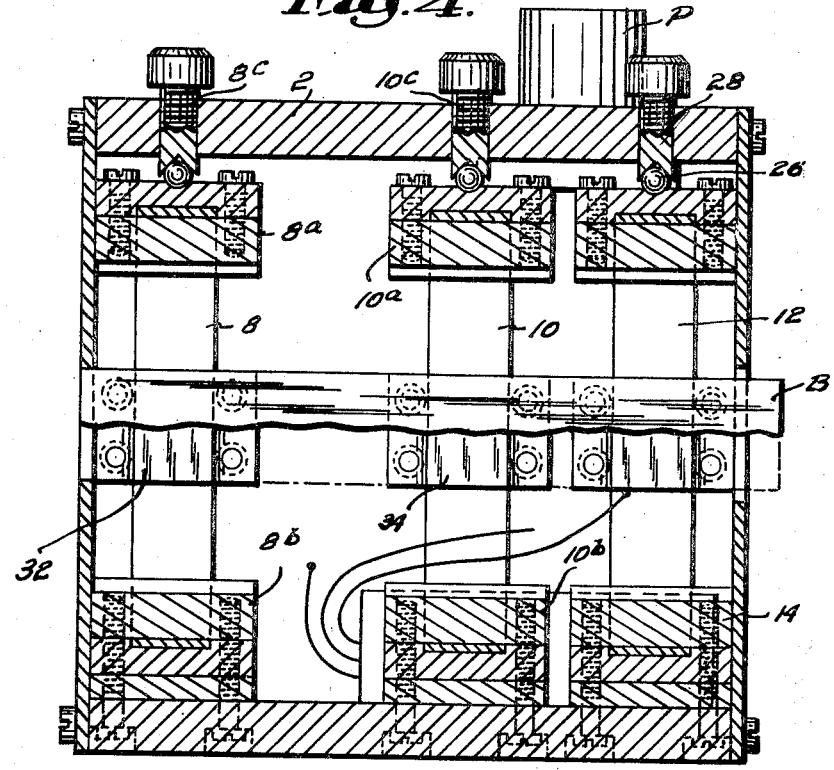
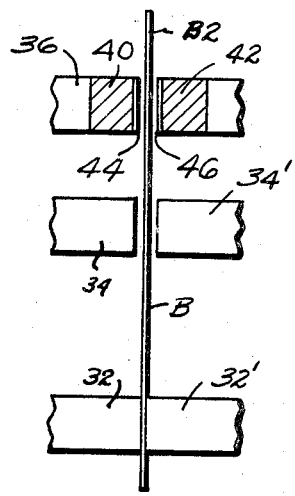
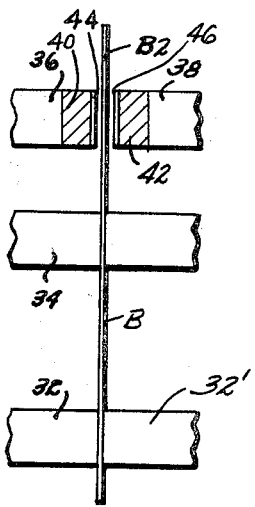
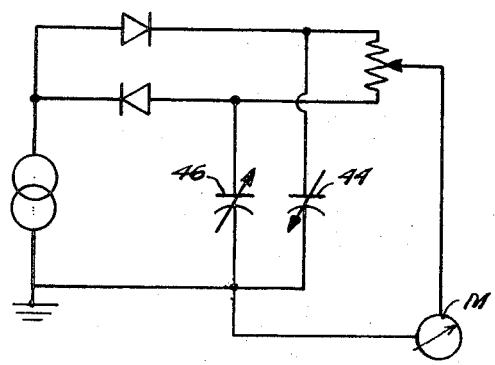
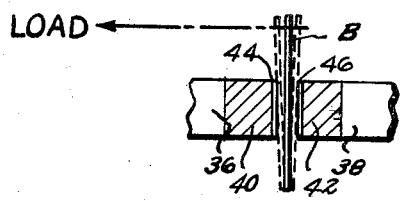
Inventor:
Jan G. Krizik,
by Munn & Hamilton
Attorney United States Patent Office 3,520,183
Patented July 14, 1970

3,520,183
APPARATUS FOR MEASURING CHANGES IN DISPLACEMENT IN A BODY
Jan G. Krizik, Wellesley, Mass., assignor to Plas-Tech Equipment Corporation, Natick, Mass., a corporation of Massachusetts
Filed Oct. 12, 1967, Ser. No. 674,891
Int. Cl. G01l 1/14
U.S. Cl. 73—141
5 Claims

ABSTRACT OF THE DISCLOSURE

A cantilever beam member of some desired cross section is supported in a multisection clamping apparatus. One clamping section rigidly secures an end of the beam in a position such that an unsupported span portion may be displaced when subjected to load forces. A second clamping section located adjacent an opposite end of the beam carries capacitor plates mounted in spaced relation at either side of said opposite beam end and a third clamping section may be moved into and out of clamping relationship with the beam at an intermediate point to vary its span and hence its stiffness. The capacitor plates are also provided with means for varying their setting relative to the beam so that when the setting is decreased the capacitance is increased and transducer sensitivity to relatively small displacements is increased. The beam may be quickly replaced by beams of greater or lesser thickness to increase or decrease load capacity and resonance frequence.

---

This invention relates in general to measuring devices and, more particularly, the invention is concerned with an improved method and apparatus for sensing changes in either load or displacement in a load displaced cantilever beam and converting these changes into electrical values.

It is a chief object of the invention to provide an improved method and apparatus for measuring changes in a load displaced cantilever beam system wherein the observed changes may relate to either load or beam displacement.

Another object of the invention is to devise a load transducer of the type involving a cantilever beam and a capacitance sensor wherein a novel beam supporting arrangement is provided.

Still another object of the invention is to devise a beam and capacitance sensing apparatus which provides for making adjustments of a highly precise nature with respect to beam span as well as capacitance, so as to provide for a relatively wide range of measurements and for observing relatively small displacements.

The nature of the invention and its other objects and novel features will be more fully understood and appreciated from the following description of a preferred embodiment of the invention shown in the accompanying drawings, in which:

FIG. 4 is a cross sectional view taken on the line 4—4 of FIG. 1;

FIG. 5 is a diagrammatic view illustrating a cantilever beam in one clamping position;

FIG. 6 is another diagrammatic view illustrating the cantilever beam in a second clamping position;

FIG. 7 is a diagrammatic view indicating a range of displacement of a beam member relative to a capacitor; and FIG. 8 is a detailed wiring diagram.

Figure 1:
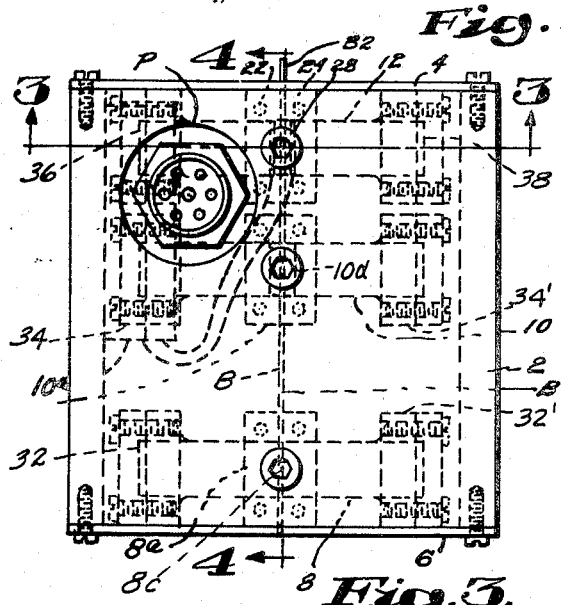
FIG. 1 is a plan view of one preferred form of transducer apparatus of the invention.
Figure 2:
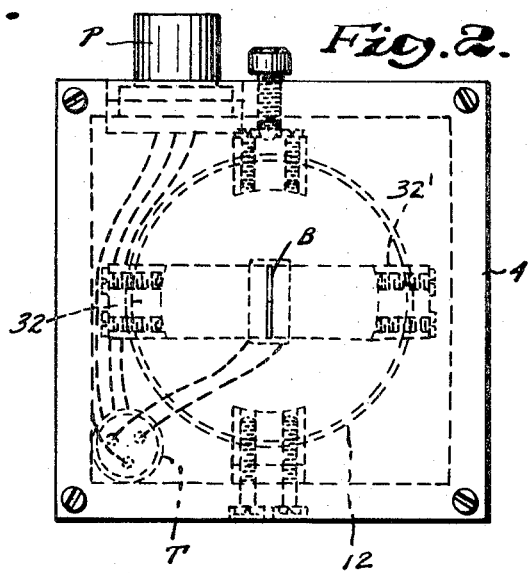
FIG. 2 is a side elevational view of the structure shown in FIG. 1.

Referring more in detail to the structure shown in the drawings and in particular FIG. 1, numeral 2 denotes an enclosure body of steel, plastic or other rigid material which is closed on two opposite ends by cover plate members 4 and 6. Transversely located through the enclosure body 2 is a beam B having a free end B2 defining an unsupported span, and free end B2 projecting outwardly from the member 4. The member 4 is formed with an opening B1 to permit displacement of the projecting free beam end B2 in two directions. This enclosure body 2 is designed to contain therein a special multisection clamping apparatus which includes a plurality of pairs of jaws and supporting clamping rings or cylinders of short axial length secured within the enclosure body in spaced apart relation as indicated in dotted lines in FIG. 1. Numeral 8 denotes one of the clamping rings, which, through its jaws, is designed to detachably secure one end of beam B in a normally fixed position and which can be used to release the beam and replace it with another. Numeral 10 denotes a second clamping ring which through its pair of jaws can move into and out of engagement with an intermediate portion of beam B and numeral 12 denotes a third clamping ring which through its pair of jaws supports capacitor elements in adjustably spaced relation to the free beam end 2.

Figure 3:
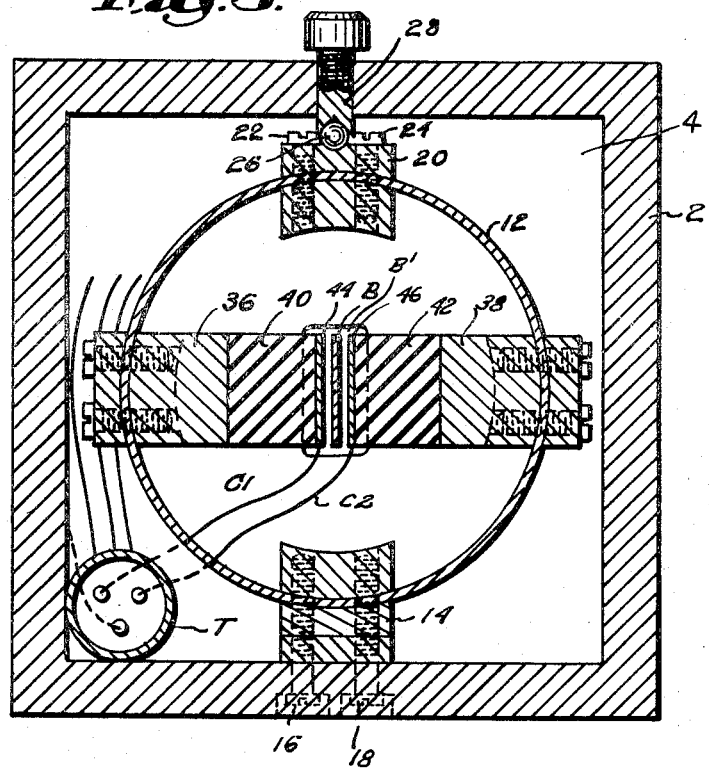
FIG. 3 is a cross sectional view taken on the line 3—3 of FIG. 1.

As is more clearly shown in FIGS. 1 and 3, the ring members are supported around the beam B from two opposite inner sides of the enclosure body 2 by means of special mounting brackets. For example, the cylinder or ring 12, as shown in FIG. 3, is secured in a fixed mounting bracket 14 attached to the enclosure body by means of threaded fastenings as 16 and 18. At its opposite side the cylinder 12 is secured in an adjustable mounting bracket 20 which is attached to the cylinder by threaded members 22 and 24. This adjustable bracket 20 is formed with ball portion 26 which is engaged by a hollow end of an adjusting screw 28 threaded into an adjacent portion of the enclosure body 2 as indicated.

It will be understood that the clamping ring 8 and the clamping ring 10 are similarly secured by means of mounting brackets of the class described and denoted by the numerals 8a, 8b, 10a, 10b, as is more clearly shown in FIG. 4. Likewise brackets 8a and 10a are adjustably contained by adjustment screws 8c and 10c threaded through the member 2 as shown.

The mounting brackets 20 and 14, as well as brackets 10a, 10b, 8a and 8b, are made in some convenient manner to engage around respective clamping ring sections and in one desirable form may comprise split bracket portions secured together by bolts or other fastenings as suggested in FIG. 4. Attached between the brackets of each ring 8, 10 and 12 in equally spaced relationship therewithin are respective pairs of jaws which are indicated in dotted lines in FIG. 1, and in FIG. 3 the jaws of ring 12 are shown in cross section and indicated by the numerals 36 and 38.

The clamping rings 8, 10 and 12 are further designed to be of a flexible nature and may be constructed of spring steel or some other suitable material. With the mounting bracket arrangement described above, it will be apparent that each of the rings may be distorted into a somewhat elliptical-like shape when the respective adjustable mounting screws as 28, 10c and 8c are threaded into the enclosure body 2. Each ring when distorted into the elliptical-like shape noted above has a minor axis and a major axis. Distorted ring side portions secured to the enclosure 2 approach one another along respective minor axes and simultaneously distorted ring side portions bearing the jaw members noted above move apart along respective major axes and as a result two opposite sides of the cylinder occurring between the mounting brackets may be moved apart quite precisely through short distances of travel.

This displacement of the attached sides of the clamping rings 8, 10 and 12 is utilized to advance and retract the respective pairs of jaws toward and away from the cantilever beam member B. Thus, as shown in FIG. 1, the cantilever beam member B has one end solidly secured in a pair of jaws 32, 32' which are bolted to the clamping ring 8 in a radially inwardly extending position and in diametrically opposite relationship to one another. One of these jaws is more clearly shown in FIG. 4 and denoted by the numeral 32.

The jaws 32, 32' may be moved by displacing the sides of ring 8 with adjustment screw 8c into and out of engagement with one end of beam B and the portion of beam B lying between this point of engagement by jaws 32, 32' and its free end B2 constitutes an unsupported span which is free to flex when subjected to a load as indicated in FIG. 7. Similarly, a second pair of radially inwardly extending jaws 34, 34' are bolted to the clamping ring 10 and one of these jaws is indicated at 34. The jaws 34 and 34' may be moved by displacing ring 10 with adjustment screw 10c into and out of engagement with an intermediate portion of beam B.

A third set of radially inwardly projecting jaws are bolted to the clamping ring 12 and the two jaw members are denoted by the numerals 36 and 38 as is more clearly shown in FIG. 3. The jaws 36 and 38 may be moved by displacing ring 12 with adjustment screw 28 toward and away from beam end B2.

There is thus provided means for detachably holding one end of beam B in a solidly anchored position, yet by adjustment of the jaws 34, if desired, the beam B may be clamped at an intermediate point to thus vary the stiffness of the beam. It will also be seen that the beam B may be very quickly removed from the enclosure by opening jaws 32, 32' and replaced by a beam of a different cross section.

Similarly, the jaws 36 and 38 may be adjusted to vary the position of the capacitor plates which are located at either side of the beam as suggested in FIG. 3. The adjustment may be made to vary the relative position of the plates with respect to the beam and particularly their spacing with respect to the beam. As shown therein the jaws 36 and 38 have mounted thereon respective insulation pieces 40 and 42 to which are attached capacitor plates 44 and 46 occurring in spaced relation to beam B as indicated. As illustrated in FIG. 3 electrical conductors C1 and C2 connect the capacitor plates 44 and 46 to an electronic device T, such as a twin T circuit of well-known character, which is also connected to an electrical connector plug P. FIG. 8 discloses a simple wiring diagram for converting displacement of the beam B by means of a load into electrical values determined by changes in the capacitance detected by capacitor plates 44 and 46. M denotes a meter for observing electrical values. Attention is directed to FIGS. 5 and 6 in which varying positions of the several sets of jaw members have been indicated. In FIG. 5 jaw members 32, 32' are engaged to hold the beam B as an unsupported span and FIG. 7 shows diagrammatically a load applied to beam B2 with displacement in two directions being indicated by dotted lines with reference to the capacitor plates 44 and 46. In this case, the jaws 34, 34' are not engaging the beam and are performing no function. In FIG. 6 the beam B is shown engaged by the jaws 32, 32' and also by the jaws 34, 34' with the result that the unsupported span of beam occurring between the point of engagement of the jaws 34, 34' and the beam end B2 is supported and made stiffer. The effect of a load such as is indicated in FIG. 7 on the beam end 2 in this case will result in a different electrical determination by the capacitor plates 44 and 46.

It will be observed that when beam B is loaded under the conditions as shown in FIG. 5, beam length is substantially greater than it is in the case illustrated under the clamping conditions of FIG. 6, and substantially greater sensitivity under load is obtained as a result of the decreased stiffness of the beam in FIG. 5 as compared to the beam in FIG. 6.

From the foregoing disclosure it will be seen that I have provided a novel method and apparatus for measuring small displacements and obtaining a considerable range of operating performance. By replacing the beam a change in stiffness may be realized as may also be the case by engaging the jaws 34, 34'. Since the spacing of the capacitor plates may also be conveniently varied the sensitivity of the transducer arrangement can be regulated in any one of three different ways and any one of these regulations or changes may be carried out quickly. It is pointed out that a broad range of loads (milligrams to hundreds of pounds) can be covered with three or four cantilever beams.

While I have shown and subscribed a preferred embodiment of the invention, changes and modifications may be resorted to within the scope of the appended claims.

I claim:

1. Apparatus for measuring displacement of a beam member comprising:
    an enclosure body,
    a beam member extending through said body, having one end projecting from the enclosure and displaceable in response to applied loads,
    a plurality of spaced ring members surrounding said beam, having one side fixed to the enclosure body and a diametrically opposed side secured to adjustment screws, adjustably mounted in said enclosure body, jaw means mounted on diametrically opposed sides of one of said ring members for supportably engaging the opposite end of said beam member, detection means, having adjustable sensitivity, mounted on another of said rings for measuring the displacement of said beam in response to applied loads, said screw means being rotatable, to force said rings into elliptical-like shapes, whereby said jaw means may be moved into and out of supportable engagement with said beam member,
    and said detection means may be moved relative to said beam member to effect adjustment of the sensitivity of said detection means.

2. A structure according to claim 1 in which the spaced ring members include a third ring for engaging the beam at an intermediate portion to effectively shorten the beam and vary its stiffness.

3. A structure according to claim 2 in which the said ring members are provided in their inner peripheral portions with pairs of jaws movable toward and away from the said beam when the rings are forced into said elliptical-like shapes.

4. A structure according to claim 3 in which the means for measuring change in displacement of the beam includes a pair of jaws having respective capacitor elements supported thereon for adjustment toward and away from the free end of the said beam.

5. Apparatus for measuring changes of displacement of a beam member including an enclosure body, a beam member located through the enclosure body, a plurality of spaced ring members mounted around the beam and secured to opposite inner sides of the enclosure body, adjustment means in the enclosure body for forcing the ring members into elliptical-like shapes, said ring members including pairs of jaws fixed to inner peripheral surfaces of the ring members and movable toward and away from one another when the ring members are forced into elliptical-like shapes, one of said pairs of jaws being arranged to engage and detachably engage and hold one end of the beam and another pair of jaws arranged at the opposite end of the beam at either side thereof and having capacitor elements located in spaced relation to the beam for detecting change in position of the beam when subjected to load forces and electrical means for converting said changes to electrical signals.

References Cited
UNITED STATES PATENTS
2,377,869  6/1945  Elliot _____ 73—95

RICHARD C. QUEISSER, Primary Examiner
J. WHALEN, Assistant Examiner

U.S. Cl. X.R.
73—88.5; 269—132; 317—246